United States Patent
Sone et al.

[11] 3,907,415
[45] Sept. 23, 1975

[54] FILM SEARCHING APPARATUS

[75] Inventors: Yoshiaki Sone, Tokyo; Fumio Ueno, Kawasaki, both of Japan

[73] Assignee: Canon Kabushiki Kaisha, Tokyo, Japan

[22] Filed: Apr. 2, 1974

[21] Appl. No.: 457,178

[30] Foreign Application Priority Data
Apr. 11, 1973  Japan............................ 48-41001
Sept. 20, 1973  Japan........................... 48-106280
Sept. 20, 1973  Japan........................... 48-106281

[52] U.S. Cl. ............... 353/26; 353/25; 355/40; 355/45; 250/233 X
[51] Int. Cl.² ............................ G03B 27/00
[58] Field of Search .... 353/26, 25; 250/233, 233 X, 250/570; 355/40, 41, 44, 45

[56] References Cited
UNITED STATES PATENTS
2,934,654  4/1960  Pakan .......................... 250/233
3,290,987  12/1966  James et al. ................... 353/26

Primary Examiner—Richard E. Aegerter
Assistant Examiner—Larry Jones
Attorney, Agent, or Firm—Fitzpatrick, Cella, Harper & Scinto

[57] ABSTRACT

An automatic film searching apparatus for selectively searching or retrieving frames from a roll of film with a number of frames recorded thereon. The arrangement is suitable for adaptation to various modes of roll-films as well as to roll-films not provided with a search or retrieve mark, or roll-films having no cut. The apparatus is controlled so as not to read unnecessary material, so that erroneous searching may be prevented.

11 Claims, 9 Drawing Figures

FILM SEARCHING APPARATUS

BACKGROUND OF THE INVENTION

1. Field of the Invention

The present invention relates to an automatic film searching arrangement for automatically searching or retrieving the desired recorded frames placed on a roll of film with a number of frames recorded thereon.

2. Description of the Prior Art

In the recent years, micro-films have been put to practical use in various fields because they can take a large quantity of information with high density within a limited space. For example, various documents such as technical literatures, patent specifications, data, drawings, catalogues, newspaper, etc. are reproduced, stored and disposed in a reduced size. However, means for searching the recorded information should fully be equipped in order to practically use these micro-films with a large quantity of information recorded thereon.

In a conventional method for searching or retrieving information placed on a microfilm, each information frame of the microfilm externally accompanies a signal search or retrieve mark and these marks are counted as the microfilm feeds, whereby the desired frame may be searched by collating the number of frames thus counted with a frame number. According to the aforesaid method, however, the searching is accomplished in frame unit and therefore, in a case where the searching is carried out in a literature (group) unit comprising a group of relative information frames, that is, a series of continuous information frames, the relation between a frame to be searched or a frame already searched and a group of information frames is examined by the use of a specific index before or after searching the frames in a frame unit, or a search code is accompanied in a white and black bit pattern with the contents of information frame and the contents in a literature unit coded between the frames and, said search code is decoded for the searching in a literature unit. The former must have a specific index or the like to collate the relation between the frame and a group of frames one by one and accordingly, the searching operation becomes troublesome and complicated, time-consuming for the search, and further the frames may erroneously be searched. The latter also involves extreme troublesome, when the searching in a literature unit is accomplished, in recording search codes as complicated search codes are recorded, and further requires a large-sized and complicated device for detecting complicated search codes. Furthermore, a microfilm is classified into two films, that is, one accompanying an information frame and a search mark while the other accompanying only an information frame, and the searching may not be accomplished with a film without accompanying a search mark. In addition, to the extreme end of a roll-film of this kind is usually connected a leading portion for guiding the extreme end of the film by means of a connection tape. In these roll-films, as the leading portion passes through a search mark detecting device by the feed of a film, the mark detecting device erroneously reads scars on a leading portion or the connection tape as search marks, and accordingly, the proper searching may not be achieved. In order to prevent such erroneous searching as described above, there is formed a cut in the side of the film between a portion, where the connection tape is pasted, or a portion connected to the leading portion and a first image frame on the film, and said cut portion is detected by a micro-switch arranged on a film transporting passage so that the starting of the mark reading by the search mark detecting device may be controlled by a signal thus detected. However, in the art just described above, a cut portion must specifically be provided in the film, and the film strength weakens in said portion during the handling of film, which results in cutting the film from the cut portion, thus damaging the film. Various disadvantages as noted above have been presented by prior art devices.

SUMMARY OF THE INVENTION

It is therefore an object of this invention to provide a film searching apparatus by which those disadvantages as described above may be eliminated.

It is a further object of this invention to provide a device for automatically searching information frames as desired by the use of various roll-films in different mode.

It is another object of this invention to provide a searching apparatus which performs the searching in a group unit to stop the desired frame properly in a predetermined position.

It is yet another object of this invention to provide a device for searching the desired frame by the use of a roll-film without accompanying a search mark.

It is still another object of this invention to provide a device for preventing the erroneous searching caused by a roll-micro-film with a leading portion connected thereto.

DESCRIPTION OF THE PREFERRED EMBODIMENTS

The invention will now be described with reference to the following embodiment taken in conjunction with the accompanying drawings.

Figure 1:
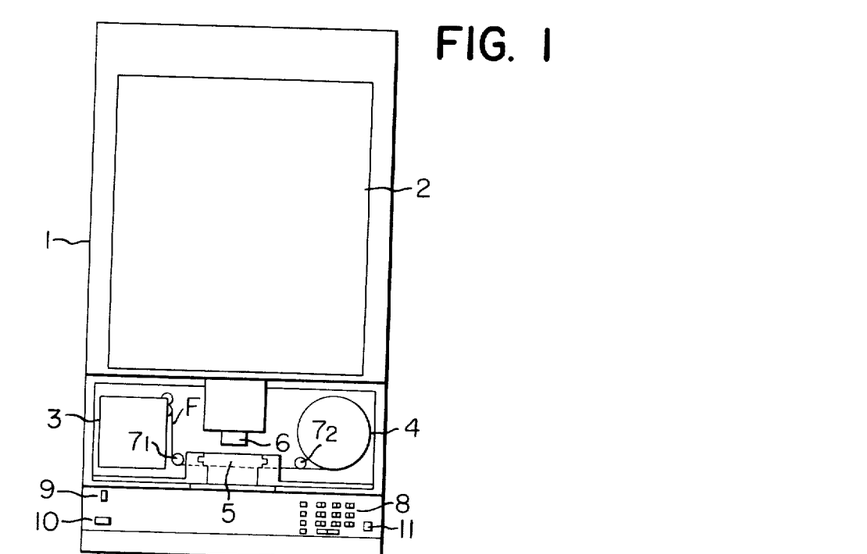
FIG. 1 is a front view of a reader printer provided with a detecting device showing an embodiment of the present invention.
Figure 2:
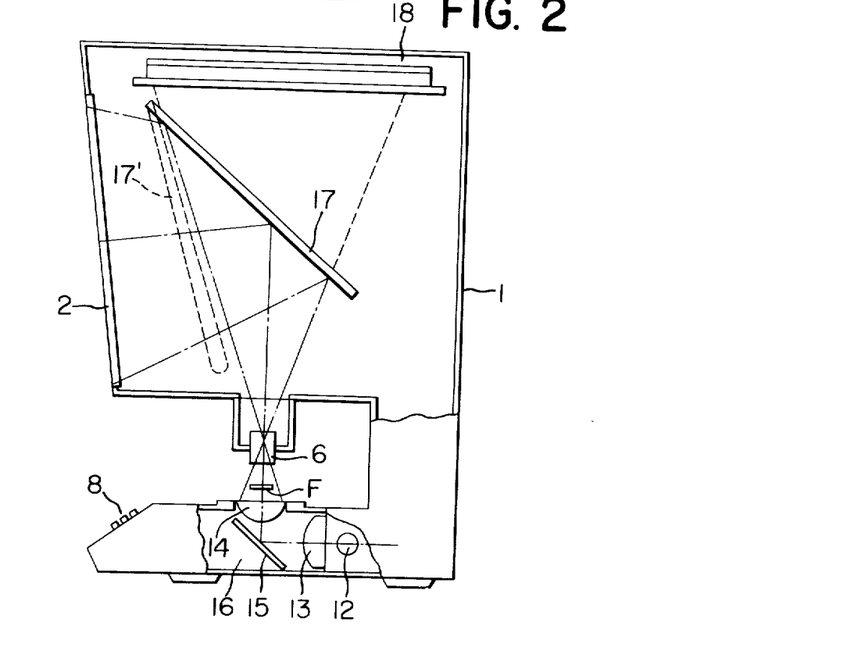
FIG. 2 is a partial cutaway side view of FIG. 1.

Referring now to FIG. 1, there is shown a reader printer 1, which comprises a screen 2 for viewing a film image projected, a film supply magazine 3 in which a lengthy roll-micro-film is encased, and a take-up reel 4. The printer further comprises a film guide 5 forming a passage through which a film F passes, a projection lens 6 arranged above the film guide 5, and the guide rollers 7₁ and 7₂. The front of the printer 1 comprises a group of search buttons 8 which instruct the search numbers, a switch 9 which changes over the searching method according to the mode of the film, a power-on switch 10, and a print button 11. Within the printer 1 there is arranged a light source system 16 including a light source lamp 12, condenser lenses 13 and 14, and a reflecting mirror 15, as shown in FIG. 2, luminescent flux from the lamp 12 being projected upon the micro-film F. Within the printer 1 there are further arranged at the upper part thereof of a rotatable mirror 17 and a printing device 18. Flux of light passed through the micro-film F passes through the projection lens 6 and from there is reflected by the mirror 17 and is then projected on the screen 2. The film image placed in a position to be projected by the light is projected on the screen 2 in an enlarged form and the image may be viewed through the screen. When the mirror 17 is rotated towards the screen to the position 17' indicated in dashed lines, the film image is projected on a sensitized paper placed in an exposure position of the printing device 18 and the projected image enlarged on the sensitized paper may be reproduced.

Figure 3:
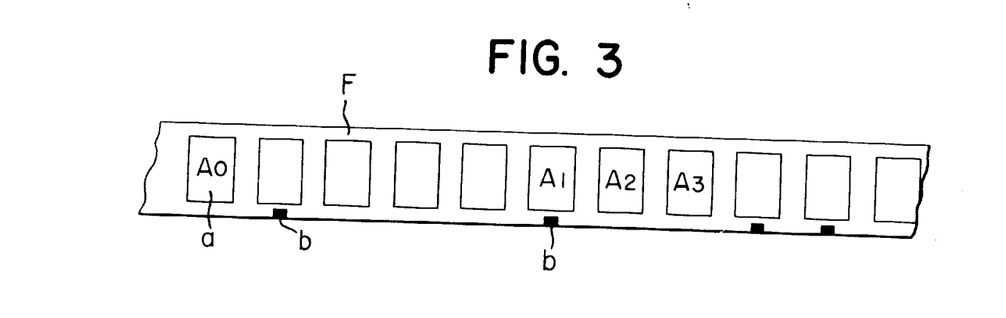
FIG. 3 is a front view of a micro-film applied to the present invention.

FIG. 3 illustrates a roll-micro-film F to be applied to the present invention, in which a lengthy micro-film F, a series of information frames *a* and group search marks *b* according to a series of relative information frames are recorded. Assume that the first frames in a series of relative frames, for example, a series of frames $A_1$, $A_2$, and $A_3$ shown in FIG. 3 are a group of literature information, the side of the frame $A_1$ is provided with a search mark *b*.

Figure 4:
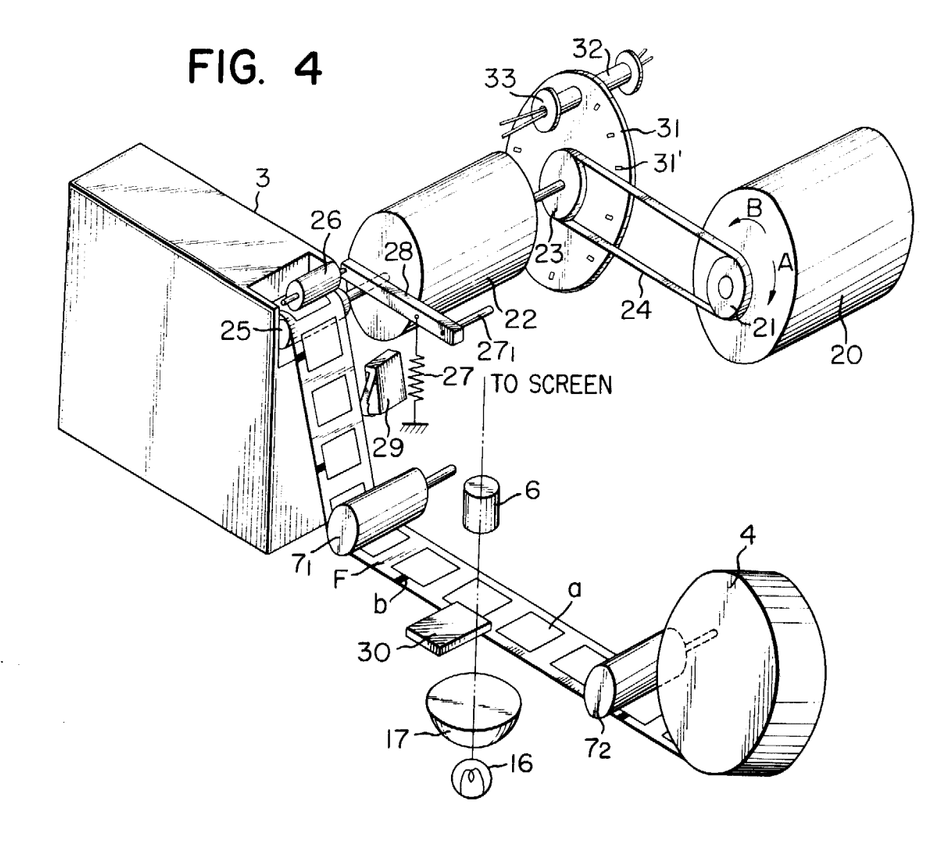
FIG. 4 is a perspective view showing the principal portions of the embodiment shown in FIG. 1.

FIG. 4 illustrates a film transport station in the aforesaid reader. An endless belt 24 is passed over between a pulley 21 mounted on a rotary shaft of a drive motor 20 and a pulley 23 mounted on a brake mechanism 22. In the vicinity of an outlet for the film in the film supply magazine 3 there are arranged a capstan roller 25 and a pinch roller 26, and the film within the magazine is moved out as the capstan roller 25 rotates. The driving force of the drive motor 20 is transmitted through the brake mechanism 22 to the capstan roller 25, and when the brake mechanism 22 is actuated in response to a signal later described, the capstan roller 25 stops to run and thus the film stops. The pinch roller 26 is rotatably supported on one end of an arm 28 which is rotated counter-clockwise on a support shaft $27_1$ by the action of a spring 27. The pinch roller 26 is normally biased against the capstan roller 25 by the force of the spring 27. A photoelectric conversion element 30, which constitutes a search mark detector, is arranged close to a film transport passage and receives the flux of light passed through the search mark when the film is transported, to thereby convert an optical signal into an electric signal. A light source 32 and a photoelectric conversion element 33 are opposedly arranged with a disc 31, which is rotated in integral with the pulley, placed therebetween which forms a pulse generator comprising the disc 31, the light source 32, and the photoelectric conversion element 33. The pulse generator means is operated in cooperation with the feeding of the film and generates pulse signals in the number according to the amount of film feed. A number of equally spaced slits 31' are formed in the peripheral side of the disc 31, and when the disc 31 is rotated in integral with the pulley 23, the pulse signals are generated by the photoelectric conversion element 33 every time slits 31' pass between the light source 32 and the photoelectric conversion element 33. A micro-switch 29, which detects the feeding of the film, is arranged in the vicinity of the film transport passage close to the outlet of the magazine 10, and when the contact of the switch 29 is engaged with the side of the film to transport the film, a signal is generated. The photoelectric conversion element 30, which constitutes a search mark detector, is arranged on the side of the film transport passage, and when the film is transported, the element 30 receives the flux of light passed through the search mark to convert an optical signal into an electric signal.

Figure 5:
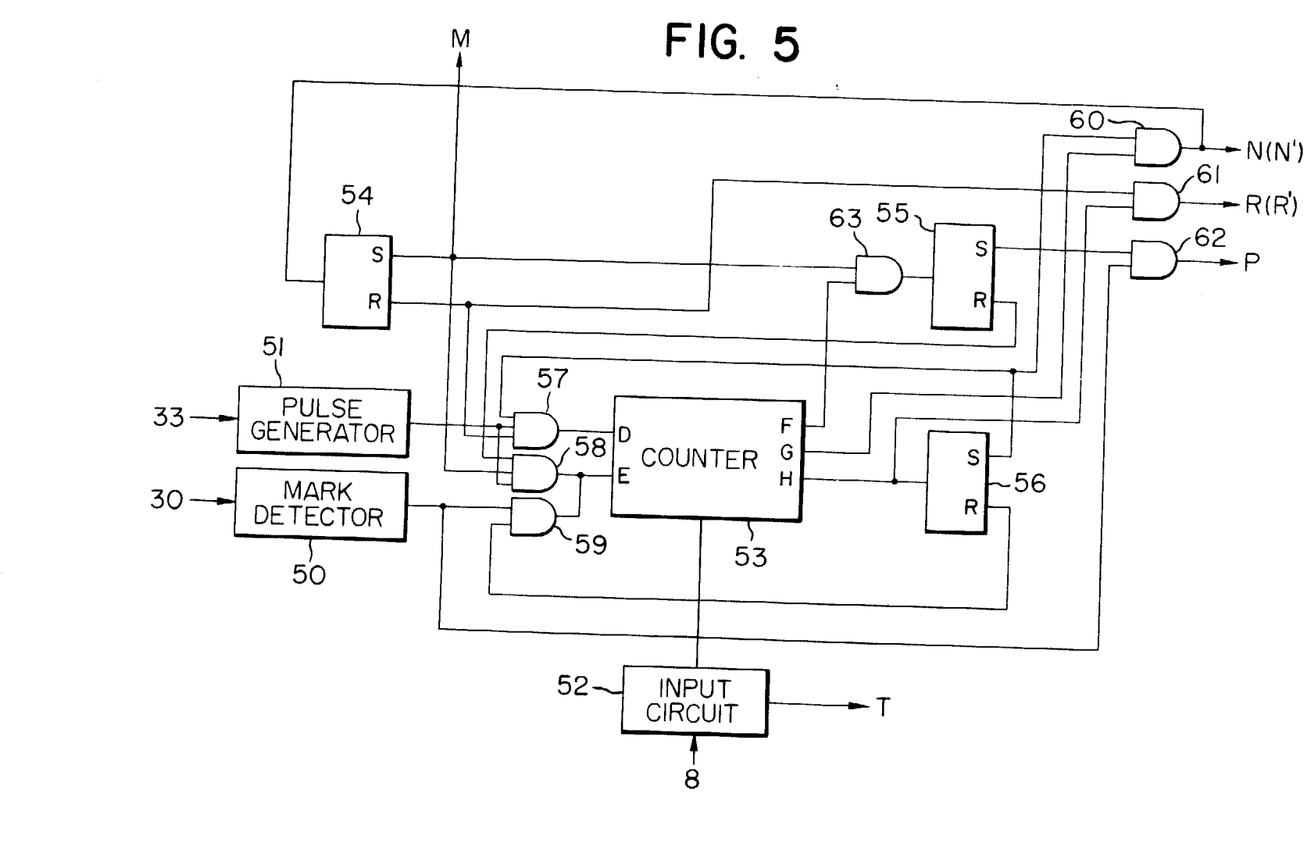
FIG. 5 is a control circuitry of the embodiment shown in FIG. 1.

FIG. 5 is a control circuitry of a searching device, and this circuitry shown in FIG. 5 comprises a mark detecting circuit 50 for receiving a detection signal transmitted from the photoelectric conversion element 30, a pulse generating circuit 51 for receiving a pulse signal transmitted from the photoelectric conversion element 33, an input circuit 52 for receiving a search number which has instructed to a group of search buttons 8, a counter 53, flip-flops 54, 55 and 56, and AND gates 57 to 62. An output of the AND gate 57 is connected to an input line D in the counter 53, and outputs of AND gates 58 and 59 are connected to an input line E in the counter 53. In the counter 53, an output line F is connected to an input of the AND gate 63, an output line G is connected to an input of the AND gate 60, and an output line H is connected to an input of the AND gate 61 and to a set input terminal of the flip-flop 56. In the flip-flop 54, the set output terminal is connected to inputs of the AND gates 58 and 63, respectively, and the reset output terminal is connected to inputs of the AND gates 57 and 61, respectively. In the flip-flop 55, the set output terminal is connected to an input of the AND gate 62 and the reset output terminal is connected to an input of the AND gate 58. Further, in the flip-flop 56, the set output terminal is connected to the inputs of the AND gates 57 and 60, and the reset output terminal is connected to an input of the AND gate 59. The output of the AND gate 63 is connected to the set input terminal of the flip-flop 55 and the output of the AND gate 60 is connected to a set input terminal of the flip-flop 54. When the photoelectric conversion element 30 detects a search mark, a high level (hereinafter referred to as "H") detection signal is induced from the mark detecting circuit 50, and when the photoelectric conversion element 33 detects a slit, a pulse signal H is induced from the pulse generating circuit 51. When flip-flops 54, 55, and 56 are in set condition, an output signal from the set output terminal is in H, and an output signal from the reset output terminal is in a low level (hereinafter referred to as "L"). When these flip-flops are in a reset condition, an output signal from the set output terminal is in L, and an output signal from the reset output terminal is in H. When each input signal is in H, each AND gate is open to induce a signal H.

Figure 6:
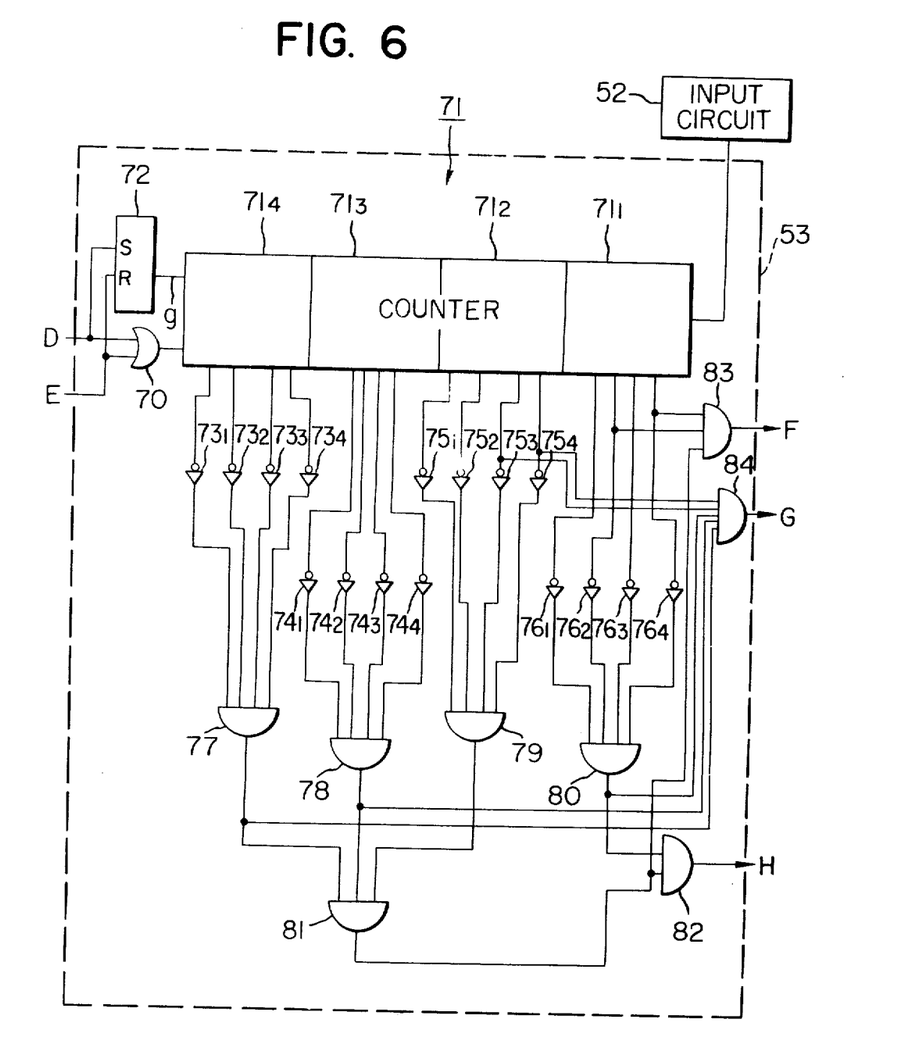
FIG. 6 is a diagram showing the electric circuit of a counter shown in FIG. 5.

FIG. 6 illustrates a specific form of a counter comprising an OR gate circuit 70, a counter circuit 71, an end column $71_1$ of a value to be counted, a second column $71_2$, a third column $71_3$, and an uppermost column $71_4$, this being countable up to a number of four columns. The counter further comprises a flip-flop 72 which controls addition and subtraction, inverters $73_1$–$73_4$, $74_1$–$74_4$, $75_1$–$75_4$, and $76_1$–$76_4$, and AND gates 77–84. A set input terminal of the flip-flop 72 is connected to an input line D, and a reset input terminal thereof is connected to an input line E. A reset output terminal g of said flip-flop 72 is connected to the counter circuit 71. When the value in each column in the counter circuit is "0", the AND gates 77 –to 82 are gated to induce H signals, respectively. When values appeared from the second column to the uppermost column are 0 and the value in the end column is "5", and AND gate 83 is gated to induce a H signal. When the value in the counter circuit is "30", the AND gate 84 is gated to induce a H signal. When a signal entered the input line D in the counter 53 is H, a signal for the output line g in the flip-flop 72 is L to place the counter circuit 71 in an addition state. At this time, when a H signal is introduced into the counter circuit 71 from the OR gate 70, the counter circuit 71 is placed in an addition state. When a signal entered the input line E is H, a signal for the output terminal g of the flip-flop 72 is H to place the counter circuit 71 in a subtraction state. At this time, when a H signal is introduced into the counter circuit 71 from the OR gate 70, the counter circuit 71 is placed in a subtraction state. When a search number is introduced into the input circuit 52 by the instruction operation of a group of search buttons 8, the search number is successively shifted leftwards and is set in the counter circuit 71. It is noted that prior to the searching operation, flip-flops 54, 55, 56, and 72 shown in FIG. 5 are in a reset condition, and accordingly, a signal for the reset output terminal g in the flip-flop 72 is H to place the counter circuit 71 in a subtraction state. The searching operation will now be described with reference to a specific embodiment. It is presumed that a unit of literature comprising for example, frames $A_1$, $A_2$, and $A_3$ is searched using a film F shown in FIG. 3. First, the power-on button 10 is depressed, and the film F in the film supply magazine is passed over the take-up reel 4 through the film transport passage or, the extreme end of the film is guided onto the take-up reel by an auto-loading mechanism. The number of a search mark b from a start position of the film to the frame $A_1$, that is, the literature number is now presumed to be "20". When a group of search buttons 8 are depressed to input the search number 20 into the input circuit 52, this number is stored in the counter circuit 71. Then, when a search start button among the group of search buttons 8 is depressed, a motor drive signal T is developed from the input circuit 52. The drive motor 20 is energized by the drive signal T to drive the belt 24 at a high speed in a direction A indicated by the arrow, and accordingly to rotate the capstan roller 25 and the pinch roller 26, whereby the film is fed at a high speed. When the photoelectric conversion element 30 detects a search mark as the film travels, a detection signal is induced from the detecting circuit 50 and at the same time a pulse signal is induced from the pulse generating circuit 51 through the photoelectric conversion element 33 by rotation of the disc 31 in response to the feeding of the film. At such time, since the flip-flop 56 is in a reset condition and when a detection signal, by which the search mark b is detected, is transmitted to the AND gate 59, this AND gate 59 is open to transmit said signal to the counter 71 through the OR gate 70. At such time, the counter circuit 71 is in a subtraction state and therefore, the signal is subjected to the subtraction counting in the counter circuit 71, and the value 20 being set in the counter circuit 71 is changed into "19". On the other hand, a pulse signal is transmitted to the AND gates 57 and 58 from the pulse generating circuit 51, but these AND gates remain closed becaused the flip-flops 54 and 56 are in a reset condition.

Every time when the photo-electric conversion element 30 detects a search b by transporting the film, the counted value in the counter circuit 71 is successively subtracted. When twenty detection signals are transmitted to the counter circuit 71, that is, when the search marks from the start position to the frame $A_1$ are counted, the counted value in the counter circuit 71 is 0. Accordingly, the value in each column $71_1$, $71_2$, $71_3$, and $71_4$ in the counter circuit 71 is 0, and the AND gate 77, 78, 79, and 80 are open to thereby open the AND gates 81 and 82, thus producing a H signal from the AND gate 82 (i.e. the output line H of the counter 53). This signal is transmitted to the flip-flop 56 and the AND gate 61 to set the flip-flop 56. At this time, since the flip-flop 54 is in a reset condition, the AND gate 61 is open to produce a motor stop signal R from the gate 61. The motor stop signal R is transmitted to the drive motor 20 to de-energize the drive motor 20, thus stopping the motor. Even if the drive motor 20 is stopped, inertia still rotates the capstan roller 25 and the pinch roller 26 and therefore, the film overruns from a position where a desired mark is detected, after a search mark has been detected. On the other hand, when the flip-flop 56 is set, the AND gate 59 is closed. However, since the flip-flop 54 is in a reset condition, the the AND gate 57 is open when a pulse signal, by which a slit 31' is detected, is transmitted to the AND gate 57, and this signal is transmitted to the counter circuit 71 through the OR gate 70. At this time, since a signal for the output line g in the flip-flop 72 is L because the AND gate 57 is being open, the counter circuit 71 is placed in addition condition, and the signal from the OR gate 70 is subjected to the addition counting in the counter circuit 71. When the film overruns and every time when the photo-electric conversion element 33 detects a slit 31', the counted value in the counter circuit 71 is successively added. When the counting value in the counter circuit 71 reaches a predetermined value 30 after the over-running, a H signal is produced from the AND gate 84 (i.e. the output line G of the counter 53). This signal is transmitted to the AND gate 60, and since the flip-flop 56 is set in a set condition, the AND gate 60 is open, thus producing a brake signal N therefrom. This brake signal N is transmitted to the brake mechanism 22 to actuate the brake mechanism 22 and accordingly to terminate rotation of the capstan roller 25, thus stopping the film F. The brake signal N is further transmitted to the flip-flop 54 to set the flip-flop 54, and a H signal is produced from the set output terminal of the flip-flop 54. This signal is transmitted as a reverse singal M to the drive motor 20 to thereby re-energize the drive 20, which in turn drives the belt 24 in a direction B indicated by the arrow reverse to the first mentioned direction, at a low speed. At this time, the flip-flop 54 is set to close the AND gate 57, thus placing the brake mechanism in an inoperative condition. In this way, the film F is fed in a direction reverse to the first-mentioned feeding direction and is sent into the supply magazine 3. Since the flip-flop 54 is in a set condition and the flip-flop 55 is in a reset condition and when a pulse signal H is transmitted from the pulse generating circuit 51 to the AND gate 58 by reversely feeding the film F, the AND gate 58 is open to transmit the aforesaid signal to the counter circuit 71 through the OR gate 70. At this time, since an output signal for the flip-flop 72 is H, the counter circuit 71 is in a substraction state and the pulse signal passed through the OR gate 70 is subjected to the subtraction counting in the counter circuit 71. Every time when a pulse signal is transmitted from the pulse generating circuit by reversely feeding the film, the counted value in the counter circuit 71 is successively subtracted. When the counted value in the counter circuit 71 reaches the above-mentioned predetermined value 5 after the reverse feeding, the AND gate 83 is open to thereby produce a H signal from the AND gate 83 (i.e. the output line F of the counter 53). This signal is then transmitted to the AND gate 63, which is to be open because the flip-flop is in a set condition. At this time, the length of the film transported in a reverse direction from the original film stop position is shorter than the length of the film overrun from the predetermined mark counting position. When the film is further transported after the flip-flop 55 has been set and the photo-electric conversion element 30 receives a search mark, a detection signal is produced from the detection circuit 50. This signal is transmitted to the AND gate 62 to thereby open the AND gate 62, thus producing a termination signal P. The termination signal P is then transmitted to the drive motor 20 and brake mechanism 22 to de-energize the drive motor 20, thus stopping its driving and at the same time to actuate the brake mechanism 22, thus stopping the film. Further, this termination signal P resets the whole circuit. Thus, the film F is reversely fed by the length of the film overrun and the desired frame $A_1$ is arranged in a predetermined position, that is, on an optical path formed between the light source 16 and the focusing lens 18, and is stopped thereat. From the above, it will be appreciated that a group of information frames as desired are automatically searched and an image in the frame $A_1$ may projected on the screen 2 or the printer means for the viewing or printing.

In the above-described embodiment, when the film is transported in a reverse direction, pulse signals in the same number as those pulse signals counted at the film overrun have been counted so as not to stop the film. This is because we intend to remove an error of a stop position for a frame to be searched arising from the fact that the pulse signal is not produced simultaneously with the mark detecting signal. According to the present invention, the film stop position when searching is accomplished is controlled by a search mark so that a frame to be searched may accurately be stopped in a predetermined position.

In the above-described embodiment, the predetermined value 5 in the counter circuit is set to a value not greater than the number of pulse signals to be counted when the film is fed by one frame, and in this particular embodiment, it is so designed that six pulse signals are counted when the film is fed by one frame. Obviously, another predetermined value 30 may be set suitably according to the feed speed of the film.

Further, in the above-mentioned embodiment, it is so designed that when the counter circuit 71 counts the predetermined number of search marks, the drive motor 20 is stopped by the motor stop signal R. Obviously, the drive motor is not necessarily stopped but may be decelerated. In this case, the drive motor 20 is stopped by a drive stop signal N' corresponding to the aforesaid film stop signal N from the AND gate circuit 60, and this signal is also used to actuate the brake means 22.

As described above, according to the present invention the searching may be accomplished in every group of information only by search marks provided on a series of relative image frames, and therefore, this arrangement can save trouble to provide each image with a search mark so required in conventional micro-films and in addition, can provide an automatic searching of a group of information, enabling the desired frame to be stopped accurately in a predetermined position.

Furthermore, pulse generating means is not limited to one as described in the above embodiment of the invention, but various conventional types may be used.

Moreover, the present invention provides not only searching of a literature unit which uses a film provided with search marks spaced apart at random, but also searching of frames which use a film provided with search marks equally spaced every information frame or a film not provided with a search mark.

Figure 7:
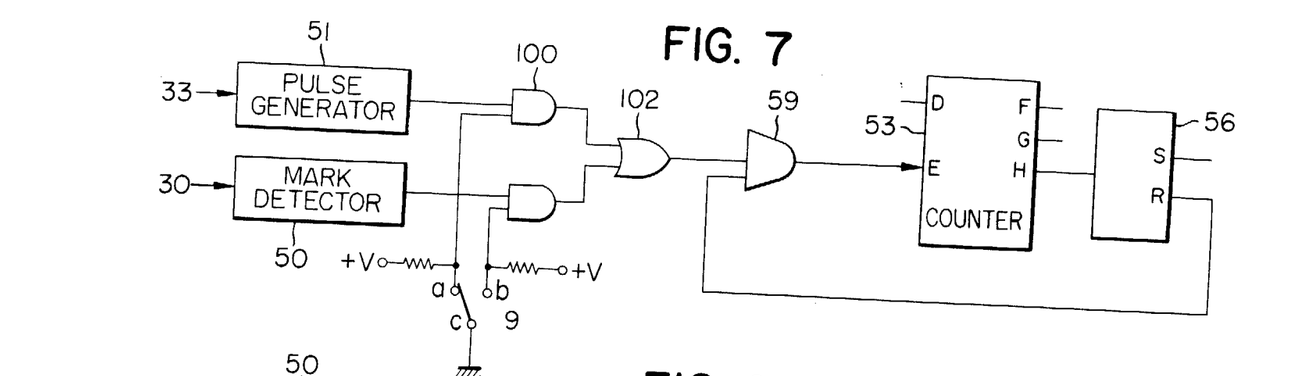
FIG. 7 is a control circuitry showing the principal portion of a searching apparatus using a roll-film in different mode.

Referring now to FIG. 7, the circuitry comprises a first AND gate and a second AND gate as indicated at 100 and 101, respectively, an OR gate 102, and a switch 9 which changes over the searching of a film provided with search marks and the searching of a film not provided with a search mark. To the inputs of the AND gates 100 and 101 is selectively applied a voltage V by the change-over of the switch 9. The outputs of both AND gates 100 and 101 are connected through the OR gate 102 to the input of the AND gate 59 as shown in FIG. 5. The frame number to be searched is inputed into the input circuit 52.

The specific embodiment will now be described.

In a case where the frame searching of film is accomplished by the use of a roll-film provided with search marks every frame, a terminal c of the switch 9 is connected to a terminal a as shown in FIG. 7. This brings one input signal of the first AND gate 100 normally in L, while the AND gate 100 is closed. Accordingly, every time when the search mark is detected, the second AND gate 101 opens and this detection signal is transmitted through the OR gate 102 to the AND gate 59. The operation other than the above will be carried out in a manner similar to those as described previously, and therefore the description will be omitted.

Now, in a case where the searching by the feed length of a film is carried out by the use of a roll-film not provided with a search mark, the terminal c of the switch 9 is connected to a terminal b. This brings one input signal of the second AND gate 101 normally in L, and therefore the AND gate 101 is closed. Accordingly, when the film is fed and every time when a pulse signal is transmitted from the pulse generating circuit 51, the first AND gate 100 opens and this pulse signal is transmitted through the OR gate 102 to the AND gate 59. The operation other than the above will be carried out similarly as mentioned above. In this way, the frame searching of film may be accomplished by the use of a roll-film not provided with a search mark. In this case, the spacing between the slits 31' in the disc 31 is so arranged as to correspond to the spacing between the frames of a roll-film, and the disc is replaced with another one in accordance with the spacing between the frames of a film to be searched. A further modification may be employed in such a way that a disc is formed with slits in several rows in a radial direction and having different spacings every row, and the light source 32 and the photoelectric conversion element 33 are displaced in a radial direction of the disc according to the sapcing between the frames of a film to be searched.

As described above, the present invention provides, according to the mode of film, an automatic searching such as frame searching using a roll-film not provided with a search mark, frame searching using a roll-film provided with search marks on every frame, and searching of literature unit using a roll-film provided with search marks on every group of information frames.

Figure 8:
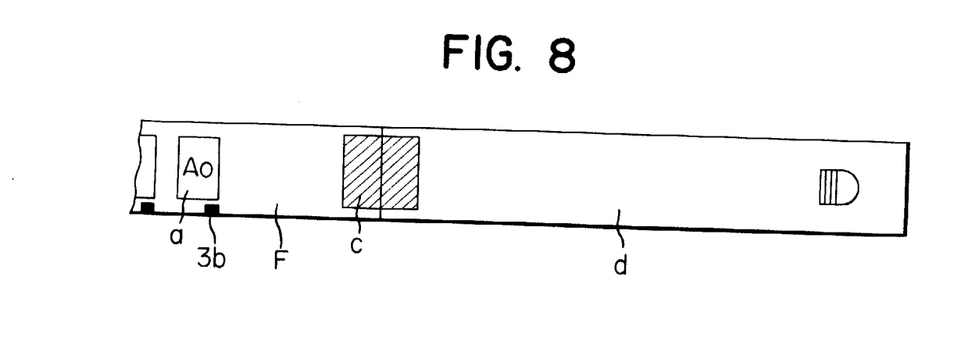
FIG. 8 is a font view of a film showing the extreme end of a roll-film.
Figure 9:
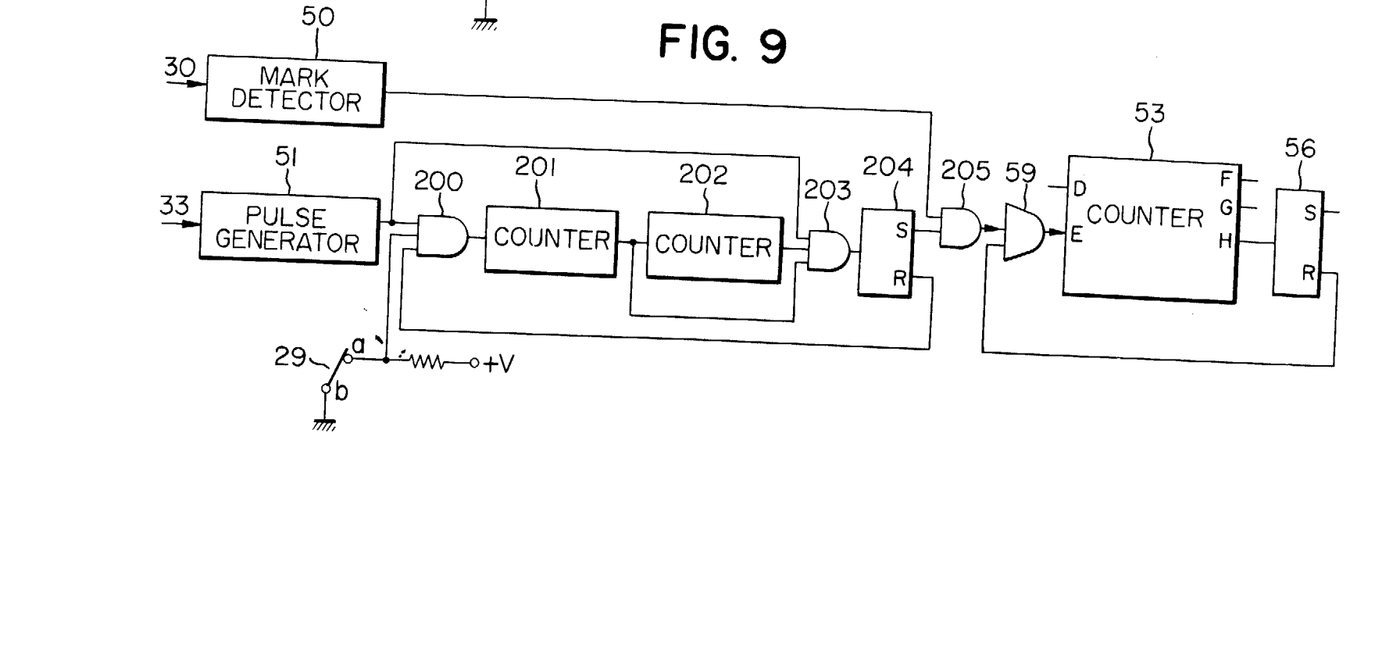
FIG. 9 is a control circuitry showing the principal portion of a searching apparatus using the roll-film shown in FIG. 8.

Referring now to FIG. 8 which illustrates one ens of a roll-film, the extreme end of the roll-film F is connected with a leading portion $d$, which guides the extreme end of the roll-film, by a connection $c$. In such a film, when the leading portion $d$ is passed through a mark detector by feeding the film, the detector erroneously detects scars or dusts on the leader tape, or connection tape $c$, and therefore, it is not possible to accomplish a proper searching. FIG. 9 illustrates a control circuit for preventing such erroneous searching. In FIG. 9, a pulse signal from the photo-electric conversion element 33 is transmitted to the pulse generating circuit 51, and a mark detection signal from the photo-electric conversion element 30 is transmitted to the mark detecting circuit 50. An output of the mark detecting circuit 50 is connected to an input terminal of an AND gate 205, and an output of the mark detecting circuit 51 is connected to an input terminal of an AND gate 200. A micro-switch 29, which detects the feed of film, has its contact $a$ connected to another input terminal of the AND gate 200. The output terminal of the AND gate 200 is connected to a decimal counter 201, and the output of the counter 201 is connected to a decimal counter 202 similar to the counter 201 and an input terminal of an AND gate 203. Another input terminal of the AND gate 203 is connected to the output of the pulse generating circuit 51, and still another input terminal of the AND gate 203 is connected to the input terminal of the counter 202, and the output terminal of the AND gate 203 is connected to a set input terminal of a flip-flop 204. A set output terminal S of the flip-flop 204 is connected to an input terminal of an AND gate 205, and a reset output terminal R is connected to an output terminal of the AND gate 200.

The operation of this circuit will now be described.

In FIG. 2, in a state where a film F is accommodated in the magazine 3 up to the extreme end of the leading portion $d$, the flip-flop 204 is in a reset condition, and when contacts $a$ and $b$ on the micro-switch 29 are connected, i.e. when the film is stopped, the flip-flop 204 is in off state. When the micro-switch 29 is turned off, the AND gate 200 is closed. Now, when the drive motor 20 is energized to cause the film F to be fed by the capstan roller 25 and pinch roller 26, the end of the film F, i.e. the leading portion $d$ passes through the micro-switch 29 to turn on the switch 29. The contacts $a$ and $b$ are then released. At this time, since the flip-flop 204 is in a reset condition, a pulse signal generated from the photoelectric conersion element 33, which has detected the light passed rhrough the slits 31′ by the rotation of the disc in response to the feed of film, is transmitted through the AND gate 200 to the counter 201. The counter 201 adds and counts pulse signals entered, and when ten pulse signals are counted by the counter 201, a column step-up signal is produced therefrom and this signal is added and counted by an adjacent counter 202. Then, when 100 pulse signals are transmitted to the counter 201, column step-up signals are produced from the counters 201 and 202. At this time, since the 100th pulse signal is transmitted to the AND gate 200, the AND gate 203 opens, and the flip-flop 204 is set by a gate output of the AND gate 203. When the flip-flop 204 is set, the AND gate 200 closes so that a pulse signal is not transmitted to the counter 201. The spacing between slits made in the disc 31, i.e. intervals of the pulse signals are predetermined such that before counters 201 and 202 produce their column step-up signals after the micro-switch 29 has been turned on, the end of film or the leading portion $d$ of film and a press tape $c$ pass through the photo-electric conversion element 30, and a first frame $A_o$ on the film reaches the position just before the photo-electric conversion element 30. When the flip-flop 204 is set, the leading $d$ and the press tape $c$ is passed through the photo-electric conversion element 30. When the photo-electric conversion element 30 detects a first search mark, a detection signal from the photo-electric conversion element 30 is transmitted to an AND gate 205, and since the flip-flop 204 is in a set condition, the AND gate 205 opens to produce a first search mark detection signal therefrom. Searching of the film is now started. The searching operation will not be further discussed since such operation has already been described above.

Means for generating pulse signals is not limited to the slit disc as illustrated in the above embodiment, but various conventional means may be used.

From the above, it will be appreciated that a mark detector is so controlled as not to read the leading portion and the connection tape when they pass through the mark detector so that erroneous searching may be prevented, and in addition, accurate searching may be secured using a film without requiring to provide with any cut.

We claim:

1. A film searching apparatus for searching desired information from a film which is provided with many kinds of information and search marks thereon, a search mark being provided for at least one of a series of associated information groups on the film comprising:

feed means for transporting the film;

light source means for irradiating said search mark;

mark detection means for receiving a flux of light projected on the search mark to generate a detection signal;

pulse generating means operated in cooperation with said feed means for generating a pulse signal in response to the feed of film;

gate means for receiving said detection signal and said pulse signal and selectively passing either one of said signals;

counter means for counting signals passed through said gate means and generating a control signal upon a count of a predetermined value;

gate control means responsive to said control signal for controlling the selection of the signal to be passed through said gate means; and transport control means for controlling the film feed of said feed means in response to said control signal.

2. A film searching apparatus according to claim 1, characterized in that said gate means comprises a plurality of gate circuits, and said gate control means comprises flip-flop circuits, said flip-flop circuits opening and closing each of the gate circuits so that said counter means may count pulse signals when a predetermined number of detection signals is counted.

3. A film searching apparatus according to claim 1, characterized in that said feed means comprises a drive motor and a film feed roller connected to said drive motor, and said transport control means comprises AND gate circuits, said AND gate circuits being arranged in such a way that a first signal is produced when said counter means counts a predetermined number of detection signals to deenergize said drive motor while rotating said feed roller, a second signal is produced when said counter means counts predetermined pulse signals after the first signal has been generated to stop feeding the film and to transport the film in a reverse direction, and a third signal is produced when said counter means counts the same number of pulse signals as the number of the first-mentioned pulse signals after the film has been reversed.

4. A film searching apparatus according to claim 1, further comprising means for changing over the searching of film provided with search marks to the searching of film not provided with a search mark.

5. A film searching apparatus according to claim 4, characterized in that said change-over means comprises a first gate circuit for receiving a pulse signal, a second gate circuit for receiving a mark detection signal and a switch for selectively opening and closing said first and second gate circuits, the searching by search marks and the searching by the length of film feed being changed over by said switch.

6. A film searching apparatus according to claim 1, further comprising cut-off means for cutting off a detection signal from said mark detection means until the first search mark placed on the film reaches said mark detection means.

7. A film searching apparatus according to claim 1 characterized in that said signal cut-off means comprises a gate circuit for receiving a detection signal, a counter for counting pulse signals from said pulse generating means, and flip-flop circuits for opening said gate circuit when the counted valve in the counter reaches a predetermined value.

8. A film searching apparatus according to claim 1, characterized in that said feed means comprises a drive motor and a film feed roller connected to said drive motor, and said transport control means comprises AND gate circuits, said AND gate circuits being arranged in such a way that a first signal is produced when said counter means counts a predetermined number of detection signals to deenergize said drive motor while rotating said feed roller, a second signal is produced when said counter means counts predetermined pulse signals after the first signal has been generated to stop feeding the film and to transport the film in a reverse direction, and a third signal is produced to stop the reverse feed of film when the difference between the number of pulse signals corresponding to the length of film fed until the second signal is produced and the number of pulse signals counted after the reverse feed of film becomes less than the number of pulse signals counted when the film is fed by one frame.

9. A film reader for searching a desired photo-image from a film which is provided with many kinds of image and search marks thereon, a search mark being provided for at least one of a series of associated image groups on the film comprising:

film feed means for transporting the film;

mark detection means for detecting said search mark when the film is transported;

pulse generating means operated in cooperation with the film feed for generating a pulse signal;

signal selecting means for selectively passing either the mark signal from said mark detection means or the pulse signal from said pulse generating means;

counter means for counting the signals passed through said signal selecting means and generating a control signal upon the count of a predetermined value;

control means responsive to said control signal for controlling the selection of the signal to be passed through said signal selecting means; and transport control means for controlling the film feed of said film feed means responsive to said control signal wherein said transport control means decelerate the speed of the film feed to overrun the film when said counter means counts the mark signal corresponding to a desired photo-image group, and the film length overrun from a desired search mark counting position being counted with the pulse signal by said counter means, and the film being reversely transported upon the count of a predetermined count value of said counter means, and the reverse transportation of the film being stopped when the number of the pulse signals corresponding to the overrun film length is counted by said counter means.

10. A searching film reader according to claim 9 further comprising means for projecting the image with an enlargment thereof, a screen for observing the projected image thereon, and means for printing the projected image.

11. A searching film reader according to claim 9 further comprising switching means for selecting searching modes between a retrievel for each image unit and a retrieval for an image unit, said switching means controlling said signal selecting means to selectively pass either the mark signal or the pulse signal when said switching means has selected the searching mode for the image group unit, and to pass only the pulse signal when said switching means has selected the searching mode for each image unit.

* * * * *

Disclaimer 3,907,415.—*Yoshiaki Sone*, Tokyo, and *Fumio Ueno*, Kawasaki, Japan. FILM SEARCHING APPARATUS. Patent dated Sept. 23, 1975. Disclaimer filed May 30, 1978, by the assignee, *Canon Kabushiki Kaisha*.
Hereby enters this disclaimer to claims 1, 2, 4, 5, 6, and 7 of said patent.
[*Official Gazette August 22, 1978.*]